United States Patent [19]
Danjo et al.

[11] Patent Number: 5,719,616
[45] Date of Patent: Feb. 17, 1998

[54] THERMAL TRANSFER FILM CASSETTE AND THERMAL TRANSFER RECORDING METHOD

[75] Inventors: Kotaro Danjo; Hitoshi Saito, both of Tokyo, Japan

[73] Assignee: Dai Nippon Printing Co., Ltd., Japan

[21] Appl. No.: 588,254

[22] Filed: Jan. 18, 1996

[30] Foreign Application Priority Data

Jan. 23, 1995 [JP] Japan ................... 7-25790
May 25, 1995 [JP] Japan ................... 7-149707
May 25, 1995 [JP] Japan ................... 7-149708

[51] Int. Cl.$^6$ ................................. B41J 32/00
[52] U.S. Cl. ........................ 347/214; 347/193
[58] Field of Search .................. 347/214, 193; 400/207, 120.13, 208, 208.1; 206/459.1, 459.5

[56] References Cited

U.S. PATENT DOCUMENTS 5,035,325   7/1991   Kitsuki .................... 206/489
5,220,352   6/1993   Yamamoto et al. ............ 346/76

FOREIGN PATENT DOCUMENTS 0 546 944   6/1993   European Pat. Off. .
0 609 683   8/1994   European Pat. Off. .

*Primary Examiner*—Huan H. Tran
*Attorney, Agent, or Firm*—Parkhurst & Wendel

[57] ABSTRACT

A thermal transfer film cassette (1) used after having been removably loaded in a thermal transfer printer (2) is disclosed, which enables an appropriate printing without being used erroneously by the thermal transfer printer and without being forged or counterfeited. The thermal transfer film cassette (1) comprises: a thermal transfer film (11) for transferring thermo-recorded data onto a receiver sheet (4); a cassette casing (10) for housing the thermal transfer film (11) therein; and a light diffractive structure (20) formed on the cassette casing, for forming a diffractive image when irradiated with reproducing light. The diffractive image has printing data related to adaptability between the thermal transfer film cassette (1) and the thermal transfer printer (2). Further, it is preferable to form the light diffractive structure as being fragile to disable the fragile light diffractive structure (40) from being used again for forgery, after having been removed.

38 Claims, 5 Drawing Sheets

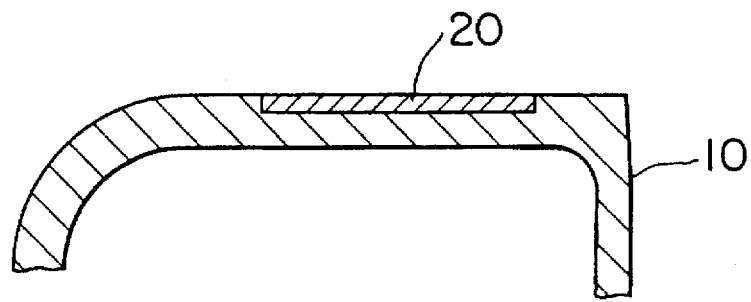
F I G. 4 (A)
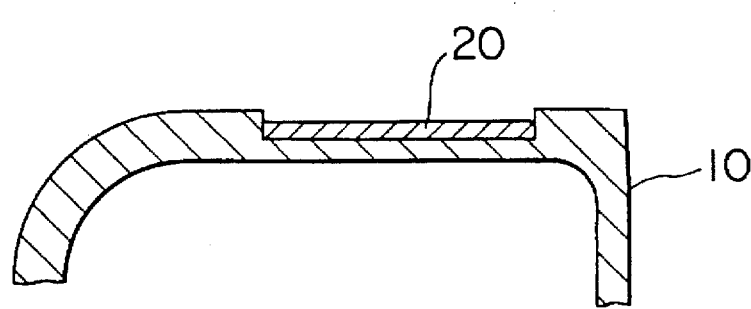
F I G. 4 (B)
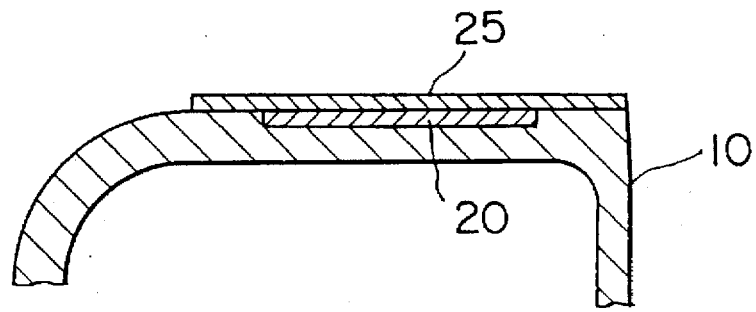
F I G. 4 (C)
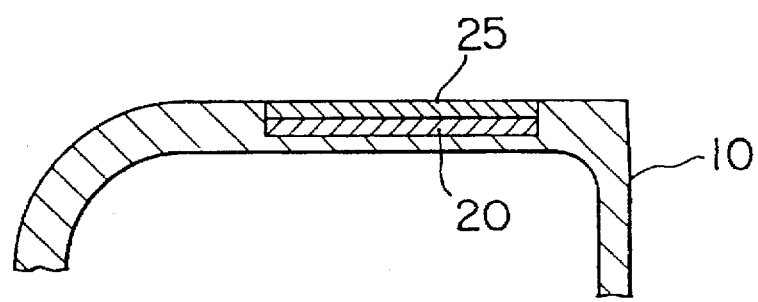
F I G. 4 (D)

THERMAL TRANSFER FILM CASSETTE AND THERMAL TRANSFER RECORDING METHOD

BACKGROUND OF THE INVENTION

The present invention relates to a thermal transfer film cassette used for a thermal transfer printer provided with a thermal head for thermally printing or recording data onto a thermal transfer film, for instance, and more specifically to a thermal transfer film cassette of a high safety which enables an appropriate printing without being used erroneously by the thermal transfer printer and without being forged or counterfeited.

In the thermal transfer cassette used for the thermal transfer printer, a thermal transfer film is accommodated according to the printing and recording usage. Therefore, there exist various thermal transfer film cassettes in which various thermal transfer films (e.g., transparency, medical image film, computer graphics film, etc.) are accommodated, separately.

However, since the external appearances of these thermal transfer film cassettes are roughly the same, there often arises a problem in that the sort of the thermal transfer film cassette to be charged or loaded on the thermal transfer printer is selected erroneously and thereby an excellent printed matter cannot be obtained.

To overcome this problem, various methods have been so far proposed. For instance, Japanese Published Unexamined (Kokai) Utility Model Application No. 3-29367 discloses a thermal transfer film cassette such that reflective marks are formed on an outer surface of the cassette casing, in order to specify the thermal transfer ink characteristics and the usage of the thermal transfer film. In this method, the specific data are transmitted to the thermal transfer printer according to the positions where the reflective marks are formed.

In this prior art method, however, since various data are merely read on the basis of the positions where the reflective marks (aluminum is deposited on a polyester film) are formed, even if a film cassette having a thermal transfer film not suitable for the used thermal transfer printer or not suitable for a specific usage is loaded, as far as the reflective mark is formed at the same position as the appropriate thermal transfer film cassette, the cassette casing having inappropriate thermal transfer film can be loaded on the thermal transfer printer, thus causing a problem in that the printing density is insufficient in the case of transparency or that a high definition picture cannot be obtained in the case of medical usage.

Further, with the advance of the diversification of usage of the thermal transfer films used for the thermal transfer printer, an increase of the quantity of used films, and the higher performance of the thermal transfer printer, there has arisen such a problem that the thermal transfer film cassettes themselves are forged or counterfeited. Accordingly, there so far exists a strong need of taking a safety countermeasure against this problem.

SUMMARY OF THE INVENTION

With these problems in mind, therefore, it is the object of the present invention to provide a thermal transfer film cassette which can secure an appropriate printing without being used erroneously by the thermal transfer printer and further which can prevent the forgery or counterfeit of the thermal transfer film cassette.

To achieve the above-mentioned object, the present invention provides a thermal transfer film cassette used after having been removably loaded in a thermal transfer printer, comprising: a thermal transfer film for transferring thermo-recorded data onto a receiver sheet; a cassette casing for housing said thermal transfer film therein; and a light diffractive structure formed on said cassette casing, for forming a diffractive image when irradiated with reproducing light, the diffractive image having printing data related to adaptability between the thermal transfer film cassette and the thermal transfer printer.

Further, the present invention provides a thermal transfer recording method of printing data by transcribing data thermo-recorded on a thermal transfer film onto a receiver sheet, comprising the steps of: irradiating reproducing light on a light diffractive structure formed on a thermal transfer film cassette casing used after having been removably loaded in a thermal transfer printer; detecting cassette printing data related to adaptability between the thermal transfer film and the thermal transfer printer on the basis of a diffractive image formed by the light diffractive structure irradiated with the reproducing light, by means of a light receiving section; and controlling the thermal transfer printer on the basis of the detected results.

In the thermal transfer film cassette according to the present invention, the light diffractive structure for forming a diffractive image when irradiated with the reproducing light emitted by a reproducing light source housed in the cassette casing can be formed only in accordance with a special technique. Therefore, it is extremely difficult to forge or counterfeit the light diffractive structure. Further, since the diffractive image can provide the cassette printing data related to the relationship between the thermal transfer film cassette and the thermal transfer printer, it is possible to ensure the adaptability relationship between the thermal transfer film cassette and the thermal transfer printer, with the result that it is possible to prevent the thermal transfer film cassette of pirated version from being put on the market. In addition, it is possible to prevent the printing quality from being degraded due to a defective thermal transfer film accommodated in the thermal transfer film cassette of pirated version or due to the mal-adaptability between the thermal transfer film accommodated in the thermal transfer film cassette and the receiver sheet set in the thermal transfer printer.

Further, since the light diffractive structure is formed on the outer surface of the cassette casing in such a way as to be flush with or recessed from the surface of the cassette casing or as to be covered with (or buried in) the transparent resin layer, it is impossible to peel off or remove the light diffractive structure from the thermal transfer film cassette for the purpose of forgery or counterfeit, with the result that the forgery or counterfeit of the thermal transfer cassette can be prevented more securely.

Further, when the light diffractive structure is irradiated with the reproducing light, the diffractive image can be reproduced. Since this reproduced image indicates the cassette printing data related to the adaptability between the thermal transfer film cassette and the thermal transfer printer, when the cassette printing data included in the reproduced image are detected by the light receiving section in order to discriminate the adaptability between the thermal transfer film cassette and the thermal transfer printer on the basis of the detected results, it is possible to control the printing operation of the thermal transfer printer on the basis of the detected results.

Further, when the light receiving section is disposed at a predetermined specific position within the thermal transfer printer according to the sort of the thermal transfer printer, it is possible to discriminate the adaptability between the loaded thermal transfer film cassette and the thermal transfer printer, on the basis of whether the diffractive image irradiated with the reproduction light can be detected by the light receiving section or not.

Further, in the thermal transfer film cassette according to the present invention, when the light diffractive structure is formed as being fragile, whenever the light diffractive structure adhered onto the outer surface of the cassette casing is tried to be removed, since the light diffractive structure can be broken and thereby cannot be used again, it is possible to prevent the removed light diffractive structure from being reused for another cassette casing for forgery.

BRIEF DESCRIPTION OF THE DRAWINGS

FIG. 4(A) is a cross-sectional view showing the case where a light diffractive structure is provided on the surface of the cassette casing in such a way as to be flush with the surface of the cassette casing;

FIG. 4(B) is a cross-sectional view showing the case where a light diffractive structure is provided on the surface of the cassette casing in such a way as to be recessed from the surface of the cassette casing;

FIG. 4(C) is a cross-sectional view showing the case where a transparent resin layer is formed on the light diffractive structure;

FIG. 4(D) is a cross-sectional view showing the case where a transparent resin layer is formed on the surface of the light diffractive structure in such a way that the surface of the transparent resin layer is flush with the surface of the cassette casing;

FIG. 6(B) is a cross-sectional view showing a modification of the second example of the fragile light diffractive structure;

DETAILED DESCRIPTION OF THE PREFERRED EMBODIMENTS

An embodiment of the thermal transfer film cassette according to the present invention will be described hereinbelow with reference to the attached drawings.

Figure 1:
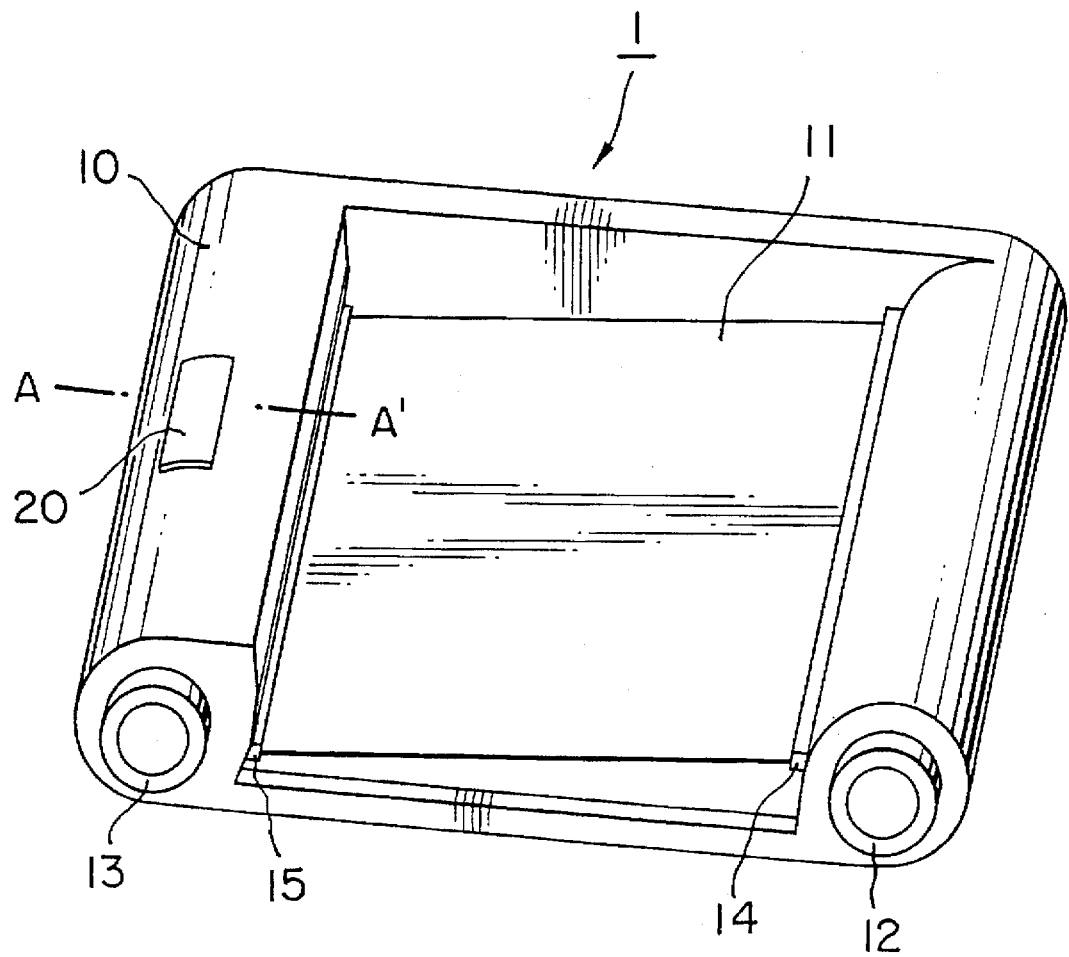
FIG. 1 is a perspective view showing an embodiment of the thermal transfer film cassette according to the present invention.
Figure 3:
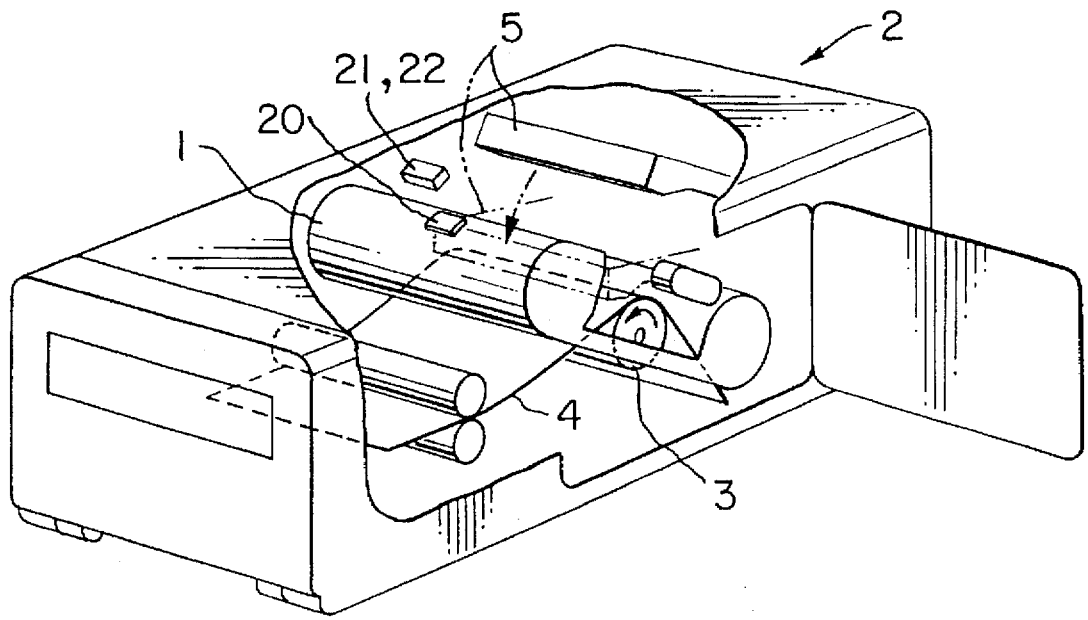
FIG. 3 is a perspective view showing the state where the thermal transfer film cassette according to the present invention is charged or loaded in the thermal transfer printer.

FIG. 1 is a perspective view showing the embodiment of the thermal transfer film cassette 1. The thermal transfer film cassette 1 is used after having been charged or loaded in or on a thermal transfer printer 2 as shown in FIG. 3. Under the condition that the thermal transfer film cassette 1 has been charged in the thermal transfer printer 2, when a platen roller 3 is rotated, a receiver sheet 4 is fed to the downward direction of the thermal transfer film cassette 1. Then, printing data are printed onto a thermal transfer film 11 housed in the thermal transfer film cassette 1 through a thermal head 5, and the printed data formed on the thermal transfer film 11 are transcribed onto a receiver sheet 4.

As shown in FIG. 1, a thermal transfer film 11 is housed in a thermal transfer film cassette 1. The thermal transfer film 11 is fed by a let-out roller 12 rotatably supported in a cassette casing 10, and then wound around a take-up roller 13. The cassette casing 10 is formed of polystyrene or ABS (acrylonitrile butadiene styrene copolymer) resin, for instance.

The cassette casing 10 is formed with two slit-shaped openings 14 and 15 so that the thermal transfer film 11 can be exposed through these slits 14 and 15 for printing by the thermal head 5.

A light diffractive structure 20 is adhered on the outer side surface of the cassette casing 10 and over the take-up roller 13. This light diffractive structure 20 is of reflective type hologram, for instance. Here, however, without being limited only to the position shown in FIG. 1, the position at which the light diffractive structure is adhered can be changed according to the structure of the thermal transfer printer 2 to be used.

On the light diffractive structure 20 for forming a hologram, various cassette printing data are recorded optically. These recorded data are indicative of the sort of the thermal transfer printer 2 which can use this thermal transfer film cassette or the usage of the thermal transfer film 11 housed in this thermal transfer film cassette 1.

Figure 2:
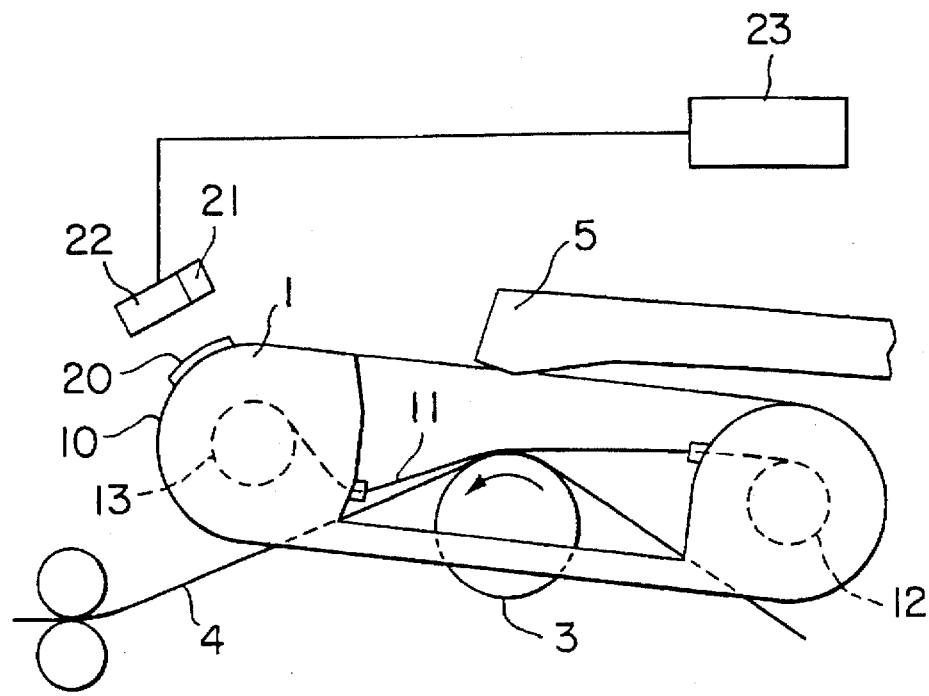
FIG. 2 is a cross-sectional view showing the state where the thermal transfer film cassette according to the present invention is being used by the thermal transfer printer.

As shown in FIG. 2, a light source 21 and a detector (light receiving element) 22 are arranged within the thermal transfer printer 2. The light source 21 is a semiconductor laser, for instance and the detector 22 is a CCD (charge coupled device) image sensor, for instance.

When the light diffractive structure 20 is irradiated with a reproducing light transmitted by the light source 21, the light is diffracted by the light diffractive structure 20 and then detected by the detector 22. Since this detected diffracted light forms a hologram image having cassette printing data recorded on the light diffractive structure 20. In other words, the diffracted light for forming the hologram image has a diffracted light distribution different according to the sort of the cassette printing data recorded by the light diffractive structure 20. Accordingly, it is possible to read the cassette printing data on the basis of the hologram image detected by the detector 22 of CCD image sensor.

As the cassette printing data, an English letter of "CP" indicative of the sort of the thermal transfer printer 2 or a numerical letter of "12" indicative of the usage of the thermal transfer film 11, for instance are recorded as a hologram image on the light diffractive structure 20. Therefore, when this hologram is detected by the detector 22 and further focused on a detection surface, it is possible to reproduce the printing data.

When the hologram image is detected by the detector the cassette printing data recorded in the form of hologram image are converted from optical signals to electric signals. The obtained electric signals are transmitted to a control circuit 23. The control circuit 23 controls the feeding operation of the thermal transfer film 11 and the receiver sheet 4, and further controls the thermal head 5. Therefore, on the basis of the cassette printing data transmitted by the control circuit 23, the thermal head 5 heats the thermal transfer film 11 to start printing picture on a receiver sheet 4 fed so as to be overlapped with the thermal transfer film 11.

In the above-mentioned embodiment, although a character pattern is recorded as the printing data on the light diffractive structure 20 in the form of a hologram image, any hologram images can be recorded, as far as the CCD image sensor can detect the hologram images. For instance, a pattern image such as a bar code, a square pattern, a circular pattern, etc. can be used, irrespective of the fact that the focusing position is finite or infinite.

Further, as the cassette printing data recorded on the light diffractive structure (hologram) 20, there exist data indicative of the sort of the thermal transfer printer 2, the usage of the thermal transfer film 11, the ink characteristics of the thermal transfer film 11, etc. Further, these data can be recorded separately or in combination.

In particular, when a single data of these cassette printing data is recorded on the hologram 20, it is possible to easily discriminate the data by the CCD image sensor. For instance, when the cassette printing data is indicative of the sort of the thermal transfer printer 2, it is possible to easily discriminate whether the loaded thermal transfer film cassette 1 is suitable for the thermal transfer printer 2 or not or whether the loaded thermal transfer film cassette 1 is a genuine parts or an imitation (i.e.. forgery) or not as follows:

The CCD image sensor is disposed on a specific position within the thermal transfer printer 2 according to the sort of the thermal transfer printer 2. When the hologram image recorded on the light diffractive structure 20 adhered on the thermal transfer film cassette 1 loaded on the printer 2 is focused on a specific position of the printer 2, the loaded thermal transfer film cassette 1 is discriminated as being suitable for the thermal transfer printer 2, with the result that the thermal transfer printer 2 is so controlled as to start the printing operation. Further, when the hologram image recorded on the light diffractive structure 20 adhered on the thermal transfer film cassette 1 loaded in the printer 2 is not focused on a specific position of the printer 2, the loaded thermal transfer film cassette 1 is discriminated as being not suitable for the thermal transfer printer 2, with the result that the thermal transfer printer 2 is so controlled as not to start the printing operation.

Further, when a plurality of data are recorded on the hologram 20, a plurality of CCD image sensors are disposed at a plurality of different specific positions within the thermal transfer printer 2 according to the sort of the thermal transfer printer 2 and the usage of the thermal transfer film 11. In this case, it is possible to discriminate the adaptability of each data separately, by discriminating whether each of the CCD sensors can detect each of the holograms corresponding to each CCD sensor, independently.

Here, the data indicative of the sort of the thermal transfer printer 2 are data indicative of a specific printer which can use the thermal transfer film cassette 1 without causing any trouble. Therefore, when a cassette having no specific data is loaded in the thermal transfer printer, the printing operation of the printer is inhibited.

Further, the data indicative of the usage of the thermal transfer printer 1 are data indicative of that the thermal transfer film housed in the thermal transfer film cassette can be used for the ordinary receiver sheet for recording video picture, or transparency, or medical picture, or computer graphics, etc. Therefore, in accordance with the data, the thermal transfer printer 2 can set the heating condition of the thermal head 5. However, when the printing data recorded on the thermal transfer film cassette 1 are different from the picture data for operating the printer, the printer will not start the printing operation.

Further, the data indicative of ink characteristics of the thermal transfer film designate the heating condition of the thermal head 5 for color correction according to the magenta coloring material layer, cyan coloring material layer, and yellow coloring material layer. This is because even in the case of the thermal transfer film 11 of the same usage, the printing color and color density deviate due to dispersion for each manufacturing lot, so that it is necessary to correct the deviation of printed color and density according to the lot of the thermal transfer film 11, respectively.

As a typical example of the light diffractive structure 20 used for the thermal transfer film cassette according to the present invention, a plane type hologram, a volume type hologram, or a diffraction grating can be used.

In the case of the plane type hologram, it is preferable to use the relief-type hologram. This is because this hologram can be recorded as a minute uneven surface and in addition easily manufactured in the form of a thermal transcription sheet (by thermal transcription method) or in the form of a thermal adhesive label or seal (by thermal adhesive method) which is particularly suitable when adhered onto the cassette casing.

Further, as the hologram recording method, it is preferable to use laser reproduction type hologram such as Fresnel hologram, Fraunhofer hologram, lensless Fourier transform hologram, etc. because of its high precision of the reproducing light generated by a laser oscillator and its high read precision at the light receiving section (i.e., detector) both arranged within the printer.

Further, when the holograms are classified from the functional and design points of views, it is possible to use a relief hologram having a total reflection type layer (as a light reflective metallic thin film layer) or a relief hologram having a transparent partial reflective layer (as a light reflective metallic thin film layer).

Further, a rainbow hologram or a Lippmann hologram can be used because these holograms are excellent in design standpoint. Further, it is also possible to use a diffraction grating manufactured optically or a direct view (vision) type diffraction grating based upon an EB (electron beam) viewing method. In the case of the direct viewing type hologram, in particular, in spite of the fact that any given patterns can be formed, since it is impossible to manufacture the same pattern by presuming it on the basis of the reproducing light, this hologram is particularly suitable from the standpoint of prevention of forgery.

Further, it is also possible to use the diffraction grating manufactured in the form of thermal transcription sheet or a thermal adhesive label or seal, in the same way as with the case of the plane type hologram.

In the present invention, since the above-mentioned cassette printing data for the thermal transfer printer 2 are recorded as a diffractive image on the light diffractive structure 20 formed on the outer surface of the cassette casing 10, when the printing data recorded on the cassette are detected by the printer, it is possible to inspect whether the thermal transfer film cassette 1 now being used is suitable for the thermal transfer printer, by use of the light diffractive structure 20.

Various examples of the methods of mounting the light diffractive structure 20 on the cassette casing 20 will be described hereinbelow with reference to the attached drawings. FIGS. 4(A) to 4(D) are enlarged cross-sectional views for assistance in explaining the status where the light diffractive structure 20 is mounted on the outer surface of the cassette casing 10 of the thermal transfer film cassette 1, taken along the line A—A in FIG. 1. However, the present invention is not limited only to those shown in FIGS. 4(A) to 4(D).

FIG. 4(A) shows the case where the surface of the light diffractive structure 20 is disposed so as to be flush with the outer surface of the cassette casing 10. The cassette casing 10 having the light diffractive structure 20 as described above can be manufactured effectively in accordance with a well-known simultaneous injection molding and painting method. In this method, the cassette casing 10 is injection molded integral with a rolled thermal transcription sheet of the light diffractive structure 20 or integral with a separated thermal adhesive label (seal) of the light diffractive structure 20, both inserted into a molding die of the injection molding machine.

FIG. 4(B) shows the case where the surface of the light diffractive structure 20 is disposed so as to be recessed from the outer surface of the cassette casing 10. In this case, the cassette casing 10 having the light diffractive structure 20 as described above can be manufactured effectively in accordance with the simultaneous injection molding and painting method such that the cassette casing 10 is injection-molded integral with a thermal adhesive label (seal) of the light diffractive structure 20 inserted into a molding die of the injection molding machine separately. Further, when the recessed depth is about several mm, the cassette casing 10 can be manufactured by the simultaneous injection molding and painting method such that the cassette casing 10 is injection molded integral with a rolled thermal transcription sheet of the light diffractive structure 20.

Here, the methods of mounting the light diffractive structure 20 on the cassette casing 10 as shown in FIGS. 4(A) and 4(B) have the following advantage, as compared with the simple case where the light diffractive structure 20 is simply mounted on the outer surface of the cassette casing 10 so as to project from the outer surface thereof. In more detail, in the simple mounting case, since a polyester film (i.e., a label or seal on which a reflective mark is formed), for instance is adhered on an already molded cassette casing 10, the reflective mark is inevitably projected from the outer surface of the cassette casing 10 by at least the thickness of the label or seal. This is not preferable because there exists such a possibility that the label or seal is easily scratched when being carried or easily peeled off for the purpose of forgery.

In contrast with this, in the methods as shown in FIGS. 4(A) and 4(B), since the light diffractive structure 20 can be molded integral with the cassette casing 10 by the simultaneous injection molding and painting method in such a way that the surface of the light diffractive structure 20 is flush with or recessed from the outer surface of the cassette casing 10, it is possible to solve the above-mentioned problem, and further to improve the productivity of the cassette casing 10 having the light diffractive structure 20 on the outer surface thereof. That is, the surface of the light diffractive structure 20 is not easily scratched or peeled off (because the adhesive strength is large), so that the light diffractive structure can be prevented from being forged.

FIG. 4(C) shows the case where the surface of the light diffractive structure 20 is disposed so as to be flush with the outer surface of the cassette casing 10 and additionally a transparent resin layer 25 is disposed on the light diffractive structure 20.

The cassette casing 10 as described above can be manufactured in accordance with the well-known bicolor injection molding method. In more detail, in the first step, the cassette casing 10 is injection molded integral with the light diffractive structure 20 in such a way that the surface of the light diffractive structure 20 is flush with the outer surface of the cassette casing 10 in accordance with a simultaneous injection molding and painting method by use of the thermal transcription sheet or the separated thermal bonding label (seal). Further, in the second step, the transparent resin layer 25 is injection molded so as to cover the light diffractive structure 20 under the condition that the cassette casing 20 having the light diffractive structure 20 is kept inserted within the molding die of the injection molding machine.

Further, in the above-mentioned bicolor molding method, since the transparent resin layer 25 is additionally injection molded in the second step, the resin layer 25 is formed so as to project from the outer surface of the cassette casing by a thickness of about 1 mm. Therefore, since the light diffractive structure 20 is formed in such a way as to be buried by the transparent resin layer 25, in the first step, it is not necessary to form the light diffractive structure 20 on the cassette casing 10 in such a way that the surface of the light diffractive structure 20 is flush with the outer surface of the cassette casing 10. In other words, in this method, it is possible to use the cassette casing 10 such that the light diffractive structure 20 is disposed on the already molded cassette casing 10 by thermal transcription (i.e., the light diffractive structure 20 is adhered so as to project from the outer surface of the cassette casing 10 by a thickness thereof). After that, in the second step, the transparent resin layer 25 is injection molded on the light diffractive structure 20 formed on the above-mentioned cassette casing 10 so as to encapsulate (i.e., protect) the light diffractive structure 20.

FIG. 4(D) shows the case where the surface of the light diffractive structure 20 is formed so as to be recessed from the outer surface of the cassette casing 10 and additionally a transparent resin layer 25 is formed on the light diffractive structure 20 so as to be flush with the outer surface of the cassette casing 10.

The cassette casing 10 having the light diffractive structure 20 as described above can be manufactured in accordance with the bicolor injection molding method in the same way as with the case shown in FIG. 4(C). In more detail, in the first step, the cassette casing 10 is injection molded integral with the light diffractive structure 20 in such a way that the surface of the light diffractive structure 20 is recessed from the outer surface of the cassette casing 10 in accordance with a simultaneous injection molding and painting method by use of the separated thermal bonding label (seal). Further, in the second step, the transparent resin layer 25 is injection molded so as to cover the light diffractive structure 20 under the condition that the cassette casing 20 having the light diffractive structure 20 is kept inserted within the molding die of the injection molding machine.

In the methods as shown in FIGS. 4(C) and 4(D), since the transparent resin layer 25 with a thickness of about 1 mm is formed on the light diffractive structure 20, the light diffractive structure 20 can be formed preferably from the design standpoint. In addition, since the light diffractive structure 20 can be perfectly protected by the transparent resin layer 25, it is impossible to remove the light diffractive structure 20, so that there exists such an effect that the structure 20 can be prevented from forgery.

As described above, in the thermal transfer film cassette according to the present invention, since the light diffractive structure 20 is formed on the cassette casing 10 in such a way that the surface of the light diffractive structure 20 is flush with or recessed from the outer surface of the cassette casing 10 or since the transparent resin layer 25 is formed on the light diffractive structure 20 formed as described above, there exists such an effect that the light diffractive structure 20 cannot be removed from the cassette casing easily for forgery. Further, when the light diffractive structure 20 is removed by force, the light diffractive structure 20 will be broken and therefore unusable.

Further, as the material of the cassette casing 10, various conventional materials can be used. For instance, synthetic resin such as polystyrene, ABS resin, polypropylene, ethylene, etc. are used by adding pigment, antistatic additives, lubricant, etc. thereto according to the necessity. Further, the shape and color of the cassette casing 10 are not limited particularly, and any shapes and colors can be used according to the printer to be used.

Further, in order to mold the transparent resin layer 25 formed on the light diffractive structure 20, a transparent resin the same as that of the cassette casing 10 can be used. However, any resin can be used as far as the resin is transparent and excellent in the adhesive characteristics to the cassette casing 10.

Further, when the adhesive characteristics of the transparent resin layer 25 to the light diffractive structure 20 is not sufficient (even if sufficient to the cassette casing 10), it is preferable to form an anchor coat layer or an adhesive resin layer on the surface of the light diffractive structure 20 for improvement of the adhesive strength.

Here, the light diffractive structure 20 to be formed on the outer surface of the cassette casing 10 will be described in detail hereinbelow.

As already explained, various holograms and diffraction grating can be used as the light diffractive structure 20. Here, however, when the typical relief hologram having a total reflection layer (a light reflective metallic thin film layer) is used, the construction is as follows:

(1) In the case of thermal transcription sheet type: a releasable supporting sheet /a releasable transparent protective layer /a hologram forming layer /a reflective metallic thin film layer /an adhesive agent layer (a thermal adhesive agent or a thermal adhesive resin)

(2) In the case of thermal adhesive label (seal) type: a transparent protective layer /a hologram forming layer /a reflective metallic thin film layer /an adhesive agent layer (a thermal adhesive agent or a thermal adhesive resin)

In the above construction, the transparent protective layer is formed as occasion demands; that is, this layer can be eliminated when the transparent resin layer 25 is formed on the light diffractive structure 20 as shown in FIGS. 4(C) and 4(D). Further, it is also preferable to form an additional anchor coat layer when the adhesive strength is not sufficient between the releasable transparent protective layer or the transparent protective layer and the hologram forming layer or between the hologram forming layer and the reflective metallic thin film layer, respectively.

Further, as the material used for the above-mentioned respective layers, any well known materials can be used as they are. In the present invention, however, since the thermal transcription sheet or the thermal adhesive label (seal) of the light diffractive structure 20 is inserted into the injection molding die and after that resin such as polystyrene or ABS is injection molded onto the surface of the adhesive agent layer of the light diffractive structure 20, for injection molding the cassette casing together with the sheet or label (seal), it is necessary that the resin of the light diffractive structure 20 has a heat resistance against the temperature required for injection molding.

As the above-mentioned releasable supporting sheet, it is possible to use a paper (e.g., a thin paper, a high quality paper, etc.) or a plastic film (on the surface of which a releasable paint is applied or coated by extrusion). As the plastic film, it is possible to use an independent film or copolymer film of polyethylene, polyolefine such as polypropylene, polyester, polyamide, acrylic resin, polyvinyl chloride, polyvinylidene chloride, etc. Among these, since polyprophylene, polyethylene or polyethylene telephtalate, etc. has a releasable property for itself, these resins can be used as not only the releasable resin but also as the releasable supporting sheet by itself. In particular, biaxial oriented polyethylene telephtalate film is suitable for use as the releasable supporting sheet, because of its appropriate releasability and heat resistance.

As the releasable transparent protective layer, various synthetic resins can be used. However, it is necessary to select a resin under consideration of the scratch and abrasion resistance, pollution resistance, and oil resistance. As the preferable synthetic resins are (1) a mixture of polymethyl methacrylate and another thermoplastic resin (e.g., vinyl chloride-vinyl acetate copolymer or nitrocellulose resin; (2) a mixture of polymethyl methacrylate and polyethylene wax; (3) a mixture of cellulose acetate and a thermosetting resin (e.g., epoxy resin, phenol resin, melamine resin, or thermosetting type acrylic resin). Therefore, it is possible to form the releasable transparent protective layer by applying a liquid of the above-mentioned resin on a releasable supporting sheet and by heating and drying the applied resin or by hardening the resin.

Further, in the case of the transparent protective layer used for the thermal adhesive label (seal), since this layer is used to basically protect the hologram forming layer, it is possible to use a resin coated layer or a laminated film. Further, since the hologram forming layer, the reflective metallic thin film layer, and the adhesive agent layer are all generally formed as a thin film respectively, there arises no problem when the hologram forming layer is thick enough to be usable in common as a supporting sheet. However, when the hologram forming layer is thin and therefore weak in strength, it is not preferable to laminate other layers on the minute uneven hologram recording surface by deposition or spattering, because the workability is low and thereby the productivity becomes deteriorate.

Therefore, it is preferable that the transparent protective layer can be used in common as the protective layer of the hologram forming layer and as the supporting body for laminating the other respective layers thereof. Further, as the material of the transparent protective layer, it is preferable to use a biaxial oriented film of polyprophylene, polyethylene telephtalate and nylon, or a single or copolymer of polyvinyl chloride, polyvinylidene chloride, polymethyl methacrylate, polystyrene, polyacrylonitrile, etc., or a transparent film such as cellulose resin. Further, by using the above-mentioned transparent protective layer as a base, it is preferable to laminate the respective layers to be formed after the hologram forming layer, in sequence on the transparent protective layer.

In the above-mentioned transparent films, a biaxial oriented polyethylene telephtalate film is preferably used as the transparent protective layer, because of its excellent tensile strength, scratch and abrasion resistance, transparency, heat resistance, etc. Further, the preferable thickness of the transparent protective layer is 5 to 100 µm, and more preferable thickness lies within a range from 10 to 50 µm.

The above-mentioned hologram forming layer is a layer on the surface of which a hologram image indicative of printing data is recorded in the form of a minute uneven surface in such a way that the printing data can be reproduced when irradiated with a reproducing light emitted by the light source.

This minute uneven surface is formed as a pattern such that the pitch is 0.1 to 2 µm and the height difference is 0.01 to 2 µm. To form the hologram image on the hologram forming layer, first a relief plate on which a predetermined minute uneven pattern is engraved is formed. After that, the hologram pattern is transcribed from the relief plate to the hologram forming layer resin in accordance with the well-known various transcription method. As the resin of the hologram forming layer, various resins such as ultraviolet ray hardened resin (e.g., acrylate, methacrylate resin), electron beam hardened resin, thermosetting resin, etc. are preferably used. However, thermoplastic resin is also usable. Among these resins, the electron hardened resin is preferably used in the present invention, because of its excellent heat resistance.

In the case where the hologram forming layer is formed of a thermoplastic resin, a great amount of the hologram forming layers can be copied by embossing method or by applying a melted resin onto the surface of the relief plate (into the uneven portions thereof) and by removing the thermoplastic resin from the relief plate after cooling. Further, in the case where the hologram forming layer is formed of a hardened resin such as the ultraviolet ray hardened resin or the electron beam hardened resin or the thermosetting resin, a great amount of the hologram forming layers can be copied by the following process: a raw hardened resin is applied onto the surface of the relief plate in the form of a film to bury the uneven portions; the resin is hardened by irradiating ultraviolet rays or electron beams onto the resin or by heating the resin; and the hardened resin is removed from the relief plate.

As described above, the hologram forming layer formed with a predetermined minute uneven pattern on the surface thereof can be formed. In this case, the thickness of the forming layer is usually 0.1 to 50 µm, although being different according to the usage of the hologram image.

The reflective metallic thin film layer is formed to provide a light reflectivity to the hologram forming layer. As the reflective metallic thin film layer, a metallic thin film of a metal such as aluminum, chromium, nickel, silver, gold, etc, is preferably used.

This thin film is formed on the minute uneven pattern formed on the surface of the hologram forming layer by the well-known vacuum deposition, spattering, ion-plating methods, etc. However, the spattering method is suitable. This is because since the thin film formed by the spattering method is high in the heat resistance so that this thin film is resistant against the temperature in the succeeding injection molding process.

The thickness of the thin film lies preferably within a range between 10 and 10,000 angstrom. When the film thickness is less than 10 angstrom, the light reflectivity is not sufficient. On the other hand, when the film thickness is more than 10,000 angstrom, the manufacturing cost increases in spite of the sufficient light reflectivity.

Further, in the present invention, as the material of the reflective metallic thin film layer in addition to the above-mentioned metals, it is possible to use the light transmissive material whose refraction index is 0.3 or more (preferably 0.5 or more) higher than that of the hologram forming layer. These materials are metal compounds such as titanium oxide, zinc oxide, tungsten oxide, etc., for instance. In this case, although the light is reflected partially (without total reflection), the material can be formed as the reflective metallic thin film having a thickness of about 100 to 5000 angstrom in accordance with vacuum deposition, spattering, ion-plating, and CVD methods.

Although the above-mentioned reflective thin film layer is of light transmissive type, since there exists a difference in refractive index between the light transmissive thin film layer and the hologram forming layer, when irradiated with the reproducing light, the reproducing light is reflected partially, so that it is possible to reproduce a hologram image due to the presence of the minute uneven pattern formed on the surface of the hologram forming layer.

Further, the adhesive agent layer is used to adhere the light diffractive structure 20 on the surface of the cassette casing 10 when the light diffractive structure 20 is injection molded together with the cassette casing 10. Therefore, any adhesive agents can be used, as far as having a thermal adhesion characteristics to the resin of the cassette casing 10.

For instance, when the cassette casing 10 is molded by use of polystyrene, it is possible to use acrylic ester resin or its copolymer resin or vinyl chloride-vinyl acetate copolymer resin. Further, when the cassette casing 10 is molded by use of polyolefine such as polypropylene, it is possible to use chlorinated polypropylene resin or ethylene-vinyl acetate copolymer resin.

The adhesive agent layer can be formed by applying a solution of the resin or by extrusion coating the resin. In general, however, the application of solution is easier. In more detail, for instance, the above-mentioned resin is solved by an organic solvent to obtain an application liquid. The obtained liquid is coated by use of a roller or a bar and then dried to form the adhesive agent layer. The appropriate thickness of the adhesive agent layer is usually 1 to 20 µm.

Further, in the present invention, the light diffractive structure 20 can be formed as a light transmissive type diffractive structure as a whole, by forming the respective layers of light transmissive materials. When the light transmissive diffractive structure 20 as described above is formed on the cassette casing 10, the surface of the cassette casing 10 under the light diffractive structure 20 can be seen from the outside. Further, it is also possible to form a colored light diffractive structure 20 by use of a transparent colorant material such as pigment or dye.

Figure 5:
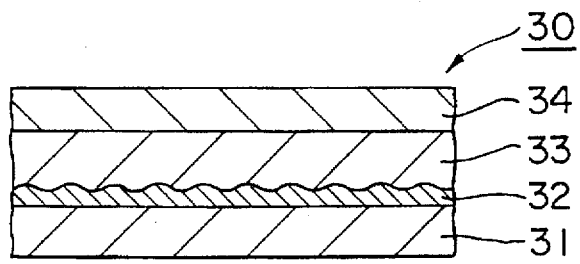
FIG. 5 is a cross-sectional view showing the construction of an embodiment of the light diffractive structure according to the present invention.

A reflective hologram 30 formed as the light diffractive structure having a light reflective metallic thin film layer will be described in detail hereinbelow with reference to FIG. 5. Here, the reflective hologram 30 is formed on the cassette casing 10 by transcribing foil in accordance with thermal transcription method. FIG. 5 is a cross-sectional view showing the reflective hologram 30.

In FIG. 5, the reflective hologram 30 is composed of an adhesive layer 31, a light reflective metallic thin film 32, a hologram forming layer 33, and a hologram protective layer 34.

The adhesive layer 31 is used to adhere the hologram 30 on the outer surface of the cassette casing 10. The major components are the same as those conventionally used as the thermal adhesive agent. Further, the thickness thereof is 0.1 to 0.5 μm.

The light reflective metallic thin film layer 32 is used to provide a reflectivity to the hologram forming layer 33. A thin film of Al, Cr, Ni, Ag, Au, etc. are preferably used. The thickness thereof is 10 to 10,000 angstrom. Further, this thin film can be formed by vacuum deposition or spattering method.

The hologram forming layer 33 is used to record a hologram image indicative of printing data. The printing data are recorded on the layer surface thereof in the form of minute uneven surface so as to be reproduced by a reproducing light. The pitch of the minute uneven surface pattern is 0.1 to 0.2 μm, and the height difference thereof is 0.02 to 2 μm. The thickness of this layer 33 is 0.1 to 50 μm. The hologram image can be formed on the surface of this hologram forming layer 33 by embossing method such that a relief plate formed with the minute uneven pattern to be formed is heated and further pressurized against the surface of the hologram forming layer 33.

To form the hologram forming layer 33, an ultraviolet ray hardened resin (e.g., acrylate resin, methacrylate resin, etc.) or hardened resin (e.g., electron beam hardened resin or thermosetting resin, etc.) is preferably used. However, the thermoplastic resin is also usable.

The hologram protective layer 34 is used to protect the hologram forming layer 33. The material is urethane resin, cellulose acetate resin, etc. The thickness thereof is 1 to 10 μm.

Further, this hologram 30 can be formed as a hologram transcription foil so as to be transcribed onto the cassette casing 10. In more detail, the hologram transcription foil is formed by laminating the hologram protective layer 34, the hologram forming layer 33, the light reflective metallic thin film layer 32 and the adhesive agent layer 31 on a polyester film in this sequence. The formed hologram transcription foil can be transcribed onto the cassette casing 10 by heating and pressurizing the foil against the cassette casing 10 by use of a hot stamp or thermal head, etc.

Further, in the present invention, it is also possible to use a light transmissive type hologram. In this case, a hologram effect layer is formed, instead of the light reflective metallic thin film layer 32. The hologram effect layer is formed of a light transmissive material whose light refraction index is 0.5 or more (preferably 1 or more) larger than that of the hologram forming layer 33.

In this hologram effect layer, since there exists a difference in refraction index between the hologram forming layer 33 and the hologram effect layer, when irradiated with the reproducing light, it is possible to reproduce a hologram image due to the presence of the minute uneven pattern formed on the hologram forming layer 33. The hologram effect layer can be formed by vacuum depositing or spattering a metal compound such as titanium oxide, zinc sulfide, tungsten oxide, etc. The thickness thereof is 100 to 5000 angstrom.

Since this hologram effect layer is of light transmissive type, when the other layers such as the protective layer, the hologram forming layer, and the adhesive layer are all formed into light transmissive type, since the entire hologram 30 can be formed as being light transmissive type. Therefore, after this hologram has been transcribed onto the surface of the cassette casing 10, the surface of the cassette casing 10 can be seen from the outside.

Further, it is also possible to color both the light reflective type hologram and the light transmissive type hologram by forming the hologram forming layer or the adhesive layer by use of a resin containing a transparent colorant material such as pigment or dye.

Further, as the hologram formed on the cassette casing 10, it is possible to use the seal type (label type) hologram. In this case, a plastic film such as polyester film is laminated on the hologram forming layer 33, instead of the hologram protective layer 34 of the above-mentioned transcription type hologram, and further the adhesive agent layer 31 is replaced with a pressure sensitive adhesive sheet such as rubber, elastomer, resin, etc.

In the above-mentioned seal type hologram, the pressure sensitive adhesive sheet is covered with a releasable paper when the hologram is kept in storage. When the hologram is adhered onto the cassette casing 10, however, the releasable pater is peel off and the hologram 10 is adhered onto the cassette casing 10 via the pressure sensitive adhesive sheet. That is, in this case, since a transcription apparatus is not required, there exists such an advantage that the hologram can be adhered onto the cassette casing easily at any places.

Then, a light diffractive structure 40 provided with a fragility according to the present invention will be described hereinbelow With reference to FIGS. 6(A) and 6(B) to FIG. 9. Here, the fragility of the light diffractive structure 40 implies that when the light diffractive structure 40 once adhered onto the outer surface of the cassette casing 10 is tried to be removed, the once adhered light diffractive structure will be broken, so that a predetermined diffractive image cannot be formed again even if the removed light diffractive structure is irradiated with the reproducing light. In other words, since being broken due to the fragility thereof, the removed light diffractive structure 40 cannot be reused. Therefore, even if the light diffractive structure 40 is removed from the cassette casing and tried to be used for another cassette casing for forgery, it is impossible to reuse the removed light diffractive structure 40 again for prevention of the structure 40 from being forged.

Some examples of the construction of the fragile light diffractive structure 40 according to the present invention will be described hereinbelow.

Figure 6A:
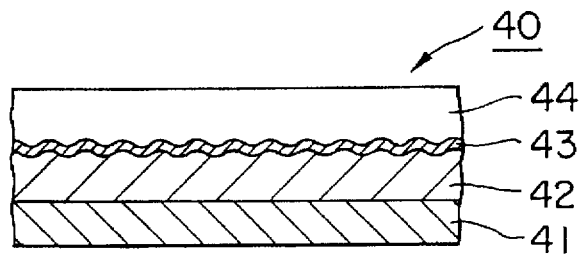
FIG. 6(A) is a cross-sectional view showing a first example of the fragile light diffractive structure formed on the outer surface of the cassette casing.
Figure 6B:
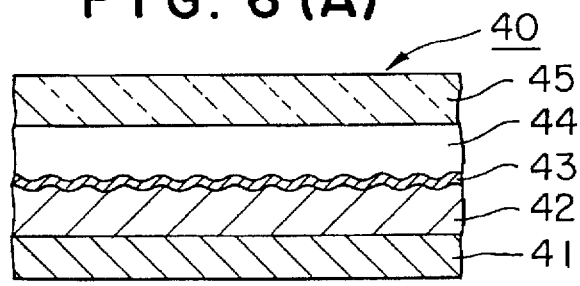
FIG. 6(B) is a cross-sectional view showing a modification of the first example of the fragile light diffractive structure.

FIGS. 6(A) and 6(B) are simplified cross-sectional views for assistance in explaining a first example of the fragile light diffractive structure 40 to be formed on the outer surface of the cassette casing.

FIG. 6(A) shows a fragile light diffractive structure 40 in which a light diffractive pattern forming layer 44, a light reflective thin film layer 43, a fragile layer 42, and an adhesive agent layer 41 are laminated in sequence from the outside thereof. Further, in FIG. 6(B), a transparent protective layer 45 is additionally formed on the light diffractive pattern forming layer 44 as an outermost layer.

In the light diffractive structure 40, a relief hologram or a diffraction grating, for instance is formed on a transcription sheet or a label (seal), and the formed sheet or label is adhered on the outer surface of the cassette casing via the adhesive agent layer 41 by thermal transcription or pressure adhesion or thermal pressure adhesion. Further, the feature of this structure is to break the entire light diffractive structure 40 beginning from the fragile layer 42 when the light diffractive structure 40 (i.e., the fragile layer 42) is tried to be peeled off, so that it is impossible to prevent the light diffractive structure 40 from being used again.

In the above-mentioned structure, the adhesive agent layer 41 is used to adhere the light diffractive structure 40 on the outer surface of the cassette casing. As the adhesive agent, various agents can be used. For instance, where the light diffractive structure 40 is formed as a thermal transcription sheet (such that the structure 40 is laminated on a releasable layer formed on a supporting substance or a releasable supporting substance) in such a way as to be adhered on the cassette casing by thermal transcription, it is possible to use a heat-sensible adhesive agent (an adhesive strength can be obtained when heated), that is, a heat seal type adhesive agent (inclusive a hot-melt adhesive agent).

As the heat-sensitive adhesive agent, it is possible to use polyethylene, polyvinyl acetate, or a copolymer of these, acrylic resin, ethylene acrylic acid copolymer, polyvinylbutyral, polyamide, polyester, plastic chloroprene, polyprophylene, polyvinyl alcohol, polyvinyl ether, polyurethane, cellulose resin, thermoplastic resin such as wax, rosin, etc. non-hardened thermosetting resin such as epoxy resin, phenol resin, etc.

Further, where the light diffractive structure 40 is formed as a label (seal) type, a pressure sensitive adhesive agent can be used in addition to the above-mentioned heat-sensitive adhesive (heat seal) type agent. As the pressure sensitive adhesive agent, it is possible to use various ester acrylate resins, a copolymer of these resins, styrene butadiene copolymer, natural rubber, silicone resin, casein, gelatine, rosin ester, terpene resin, phenol resin, styrene resin, cumarone indene resin, xylene resin, etc.

In use of the pressure sensitive adhesive agent, in general, the pressure sensitive adhesive surface is covered with a releasable paper, and the adhesive surface is adhered after the releasable paper has been removed therefrom. In this case, the light diffractive structure can be adhered on the cassette casing 10 by use of a labeling machine or manually.

Further, in the case of the label (seal) type, a delayed tack (adhesion) type adhesive agent can be used as a specific adhesive agent. In this agent, the adhesive strength can be obtained by heating, and the label (seal) can be fixed to the cassette casing after a time has elapsed. Therefore, there exists such an advantage that no releasable pater is needed because the adhesiveness thereof can be obtained only after heated.

In the above-mentioned light diffractive structure 40, it is preferable that the adhesive strength of the adhesive agent to the cassette casing is as strong as possible. In order to prevent the forgery by removing the light diffractive structure for reuse, it is necessary that the adhesive strength of the light diffractive structure to the cassette casing is stronger at least than that between the fragile layer 42 and the adhesive agent layer 41. Therefore, when the pressure sensitive adhesive agent is used, it is particularly required to select an agent whose tack (adhesion) is strong and stable with the passage of time.

Further, the thickness of the adhesive agent layer is preferably 1 to 30 µm, although being different from the kinds of the adhesive agent.

The fragile layer 42 is formed between the upper light reflective thin film layer 43 and the lower adhesive agent layer 41. The function of this fragile layer 42 is to adhere the upper and lower layers with a sufficient adhesive strength and in addition to break the entire light diffractive structure 40 beginning from this fragile layer 42 when the light diffractive structure 40 is tried to be peeled off.

The fragile layer 42 laminated for the purpose as described above can be usually formed by dispersing non-organic powder within the resin constituent. However, without being limited only to the non-organic powder, organic power can be used as far as being dispersed within the resin constituent uniformly, without being soluble mutually and further without being adhered to the resin constituent.

As the resin constituent used for the fragile layer 42, it is possible to use styrene resin and its copolymer such as styrene, poly-α-methyl styrene, etc., acrylic or methacrylate resin and its copolymer such as polymethyl methacrylate, polyethyl methacrylate, polyacrylic ester, polyacrylic methyl, polyacrylic butyl, etc., cellulose derivative such as ethyl cellulose, nitro cellulose, ethyl hydroxy ethyl cellulose, cellulose acetate propionate, cellulose acetate butylate, cellulose acetate, etc., one or a mixture of two or more of polyvinyl alcohol, poly vinyl acetate, polyvinyl chloride, polypropylene, polyethylene, polyester resin, etc.

Further, as the non-organic powder added to the above-mentioned resin constituent, it is possible to use powder of calcium carbonate, talc, china clay, kaolin, microsilica, titanium dioxide, glass flake, asbestos, agalmatolite, silica powder (stone powder), barium sulfate, etc.

The additive rate of the non-organic power is preferably 50 to 200 parts by weight relative to 100 parts by weight of the resin constituent. When the additive rate of the non-organic power is less than 50 parts by weight, the fragile effect of the fragile layer decreases, and when more than 200 parts by weight, the fragile layer is difficult to form. Further, the thickness of the fragile layer is preferably 4 to 40 µm.

The reflective thin film layer 43 is formed to provide a light reflectivity to the light diffractive pattern forming layer 44. Therefore, it is preferable to use a metallic thin film of light reflective type such as, aluminum, chromium, nickel, silver, gold, etc.

This thin film can be formed in accordance with the well-known vacuum deposition or spattering method in order to form a minute uneven pattern surface on the light diffractive pattern forming layer 44. In particular, the thin film formed by spattering is preferable because its high heat resistance and its durability, in the case where the thin film is heated in the later process.

Here, as the reflective thin film layer 43, it is possible to use the afore-mentioned reflective metallic thin film layer or the layer equivalent to the light reflective metallic thin film layer 32 as shown in FIG. 5.

Further, although not shown, as a modification of the first example, it is also possible to form an anchor layer between the fragile layer 42 and the reflective thin film layer 43 to further increase the adhesive strength between the two layers. When the anchor layer is formed additionally, when the light diffractive structure 40 is tried to be removed from the cassette casing, since the fragile layer 42 can be securely adhered to the reflective thin film layer 43, the light diffractive structure 40 can be broken more securely beginning from the fragile layer 42, so that it is possible to prevent the reuse of the light diffractive structure 40 more effectively.

As the anchor layer material, it is possible to use conventional anchor agent such as vinyl chloride, vinyl acetate, polyvinyl alcohol, and the copolymer thereof, urethane resin, epoxy resin, polyester resin, etc. In addition, the resins as already explained as the material for composing the heat sensible adhesive agent used to form the adhesive agent layer 41 can be used as the anchor agent. The thickness of the anchor layer is preferably 3 to 20 µm.

The above-mentioned light diffractive pattern forming layer 44 is a layer on the surface of which a light diffractive image indicative of printing data is recorded in the form of a minute uneven surface in such a way that the printing data can be reproduced when irradiated with a reproducing light emitted by the light source.

This minute uneven surface is formed as a pattern such that the pitch is 0.1 to 2 µm and the height difference is 0.01 to 2 µm.

As the light diffractive pattern forming layer 44, it is possible to use the afore-mentioned hologram forming layer or the layer equivalent to the hologram forming layer 33 shown in FIG. 5.

The transparent protective layer 45 is formed to protect the light diffractive pattern forming layer 44 as occasion demands. In general, this protective layer 45 is formed as an outermost layer of the light diffractive structure 40. Further, a light transmissivity is required for the reproducing light. Therefore, the transparent protective layer 45 is not necessarily transparent for visible rays.

When the light diffractive structure 40 is of label (seal) type adhered on the outer surface of the cassette casing, the transparent protective film 45 can be formed as a layer obtained by painting a resin on the outermost surface of the light diffractive structure 40 or as a film laminated on the same outermost surface thereof.

Further, when the light diffractive structure 40 is of thermal transcription type thermo-transcribed on the outer surface of the cassette casing, the transparent protective film 45 can be formed as a painted film layer (releasable protective layer) removably applied onto a supporting film.

Although not limited specially, it is preferable to form the transparent protective layer 45 by a material excellent in scratch and abrasion resistance, transparency, heat resistance, etc. Therefore, as the painted film layer of the label (seal), it is possible to use ionizing radiation hardened type resin having various acrylic resin as the major constituent or a resin having urethane resin or cellulose acetate resin as the major constituent. Further, as the laminated film, it is possible to use a biaxial oriented polyethylene telephtalate film, a biaxial oriented polypropylene film, a biaxial oriented nylon film, and other cellulose resin films.

Further, as the painted film layer of the label (releasable protective layer) removably applied on the supporting film substance of the thermal transcription seat, it is possible to preferably use a resin obtained by adding a small amount of methylol melamine resin to cellulose acetate resin, for instance when the biaxial oriented polyethylene telephtalate film is used.

Figure 7A:
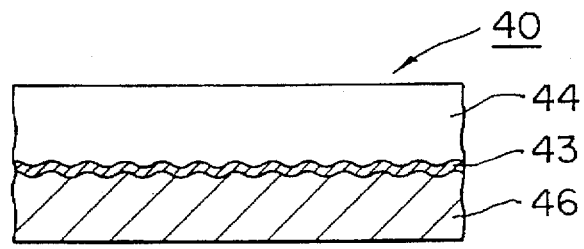
FIG. 7(A) is a cross-sectional view showing a second example of the fragile light diffractive structure formed on the outer surface of the cassette casing.
Figure 7B:
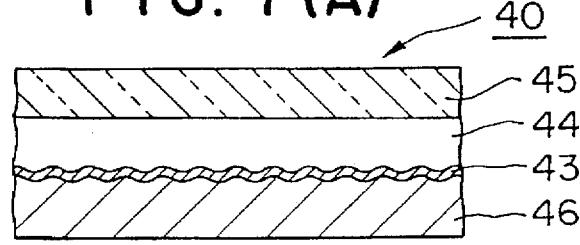

FIGS. 7(A) and 7(B) are simplified cross-sectional views for assistance in explaining a second example of the fragile light diffractive structure 40 to be formed on the outer surface of the cassette casing.

FIG. 7(A) shows a fragile light diffractive structure 40 in which a light diffractive pattern forming layer 44, a light reflective thin film layer 43, a fragile adhesive agent layer 46 are laminated in sequence from the outside thereof. Further, in FIG. 7(B), a transparent protective layer 45 is additionally formed on the light diffractive pattern forming layer 44 as an outermost layer.

In the light diffractive structure shown in FIGS. 7(A) and 7(B), without forming an additional fragile layer between the adhesive agent layer and the reflective thin film layer as in the first example, the adhesive agent layer itself is formed as a fragile adhesive agent layer 46. Therefore, when the light diffractive structure 40 is tried to be removed or peeled off from the cassette casing, the fragile adhesive agent layer 46 is first peeled off, so that the light diffractive structure 40 is broken beginning from this layer 46. Further, in this case, since the surface of the fragile adhesive agent layer 46 remaining on the reflective thin film layer 43 is exposed as an uneven surface due to a non-uniform adhesive strength of the fragile adhesive agent layer, it is impossible to reuse the peeled-off light diffractive structure 40, thus preventing the light diffractive structure from being used again.

As the fragile adhesive agent layer 46 of the light diffractive structure 40 shown in FIGS. 7(A) and 7(B), it is possible to use a material obtained by adding one or two or more fillers to the various adhesive agents as explained in the first example shown in FIGS. 6(A) and 6(B). These fillers are powder of calcium carbonate, talc, china clay, kaolin, micro-silica, titanium dioxide, glass flake, asbestos, agalmatolite, silica powder (stone powder), barium sulfate, etc. Here, since the fillers are used to allow the adhesive agent to be fragile, it is preferable to adjust the amount of fillers according to the kinds of the adhesive agent. In usual, however, it is preferable to add the fillers of 50 to 300 weight by parts to the solid adhesive agent of 100 weight by parts. When less than 50 weight by parts, the fragile effect cannot be obtained, and when more than 200 weight by parts, the adhesive strength is reduced. Further, the thickness of the fragile adhesive agent layer 46 is preferably 20 to 50 µm.

In this second example, although not shown, it is also possible to form an anchor layer between the reflective thin film layer 43 and the fragile adhesive agent layer 46 to further increase the adhesive strength between the two layers. If the anchor layer is formed additionally, whenever the light diffractive structure 40 is tried to be removed from the cassette casing, since the fragile adhesive agent layer 46 can be securely adhered to the reflective thin film layer 43, the light diffractive structure 40 can be broken more securely beginning from the fragile adhesive agent layer 46, so that it is possible to prevent the reuse of the light diffractive structure 40 more effectively.

As the anchor layer material, it is possible to use conventional anchor agent such as vinyl chloride, vinyl acetate, polyvinyl alcohol, and the copolymer thereof, urethane resin, epoxy resin, polyester resin, etc. In addition, the resins as already explained as the material for composing the heat sensible adhesive agent used to form the adhesive agent layer 41 shown in FIGS. 6(A) and 6(B) can be used as the anchor agent. The thickness of the anchor layer is preferably 3 to 20 µm.

Further, the respective layers such as the reflective thin film layer 43, the light diffractive pattern forming layer 44 and the transparent protective layer 45 (other than the fragile adhesive agent layer 46) are the same as with the case of the first example as described with reference to FIGS. 6(A) and 6(B), so that the similar description thereof is omitted herein.

Figure 8A:
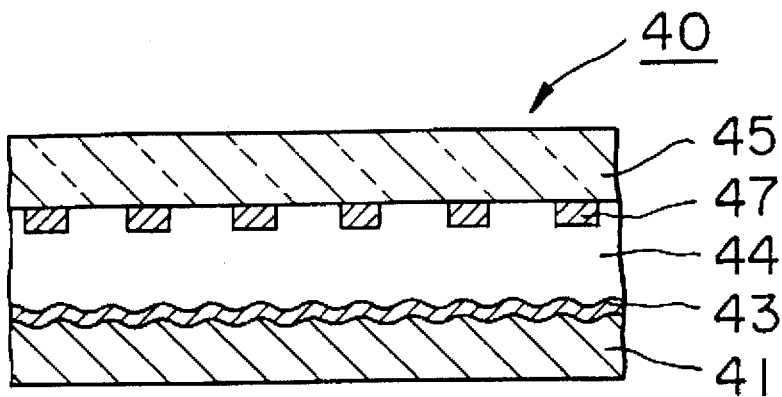
FIG. 8(A) is a cross-sectional view showing a third example of the fragile light diffractive structure formed on the outer surface of the cassette casing.
Figure 8B:
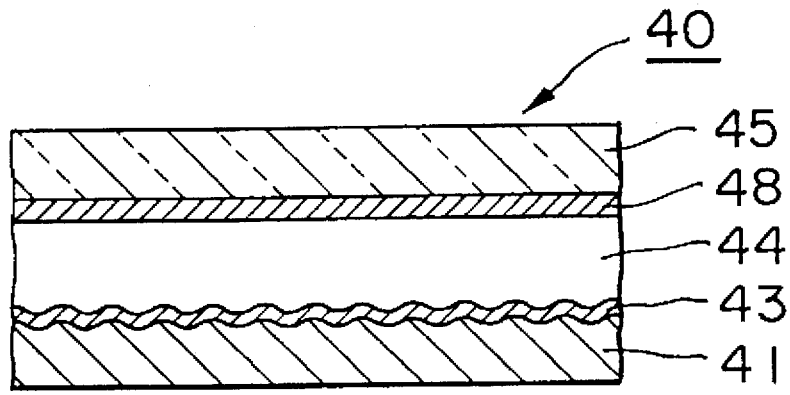
FIG. 8(B) is a cross-sectional view showing a modification of the third example of the fragile light diffractive structure.

FIGS. 8(A) and 8(B) are simplified cross-sectional views for assistance in explaining a third example of the fragile light diffractive structure 40 to be formed on the outer surface of the cassette casing.

FIG. 8(A) shows a fragile light diffractive structure 40 in which a transparent protective layer 45, a pattern shaped peel-off layer 47, a light diffractive pattern forming layer 44, a light reflective thin film layer 43, an adhesive agent layer 41 are laminated in sequence from the outside thereof. Further, in FIG. 8(B), the pattern shaped peel-off layer 47 is replaced with an entire surface peel-off layer 48 in the light diffractive structure 40.

In this light diffractive structure 40, the fragile structure can be obtained by forming the pattern shaped peel-off layer 47 or the entire surface peel-off layer 48 between the light diffractive pattern forming layer 44 and the transparent protective layer 45, which is somewhat different from the construction of the light diffractive structure shown in FIGS. 6(A) and 6(B) or FIGS. 7(A) and 7(B).

In FIG. 8(A), since the pattern shaped peel-off layer 47 is formed between the light diffractive pattern forming layer 44 and the transparent protective layer 45, when the light diffractive structure 40 formed on the cassette casing is tried to be removed, an interface between the transparent protective layer 45 and the pattern shaped peel-off layer 47 or an interface between the pattern shape peel-off layer 47 and the light diffractive pattern forming layer 44 is peeled off. In other words, since the transparent protective layer 45 and the light diffractive pattern forming layer 44 are adhered to each other strongly at the area where the pattern shaped peel-off layer does not exist, the light diffractive structure 40 is peeled of or broken at any one of the light diffractive pattern forming layer 44, the reflective thin film layer 43, and the adhesive agent layer 41 or the weakest one of the interfaces between these layers. As a result, since at least the light diffractive pattern forming layer 44 is cracked partially, so that the light diffractive structure 40 is broken and thereby not used again.

Further, in the case shown in FIG. 8(B), since the entire surface peel-off layer 48 is formed between the light diffractive pattern forming layer 44 and the transparent protective layer 45, when the light diffractive structure 40 formed on the cassette casing is tried to be removed, an interface between the transparent protective layer 45 and the entire surface peel-off layer 48 or an interface between the entire surface peel-off layer 48 and the light diffractive pattern forming layer 44 is peeled off, or else the whole of the transparent protective layer 45 and the entire surface peel-off layer 48 are removed. Therefore, the layers remaining on the cassette casing are the respective layers formed under the entire surface peel-off layer 48 or under the light diffractive pattern forming layer 44 (i.e., the light diffractive pattern forming layer 44, the reflective thin film layer 43, the adhesive agent layer 41, etc.). Here, since the thicknesses of these layers formed by coating, vacuum deposition or spattering are relatively thin, even if the entire layer of one of these layers is tired to be removed again, the layer will be deformed or broken easily due to a small tensile strength, with the result that the removed layer cannot be reused even if removed.

Further, in the light diffractive structure 40 shown in FIGS. 8(A) and 8(B), it is preferable that the outermost transparent protective layer 45 can be used in common as the protective layer and the supporting substance for laminating the other respective layers thereon. As the material of transparent protective layer 45, it is preferable to use a biaxial oriented film of polyprophylene, polyethylene telephtalate, nylon, or a single or copolymer of polyvinyl chloride, polyvinylidene chloride, polymethyl methacrylate, polystyrene, polyacrylonitrile, etc. or a transparent film such as cellulose resin. However, a biaxial oriented polyethylene telephtalate film is preferably used as the transparent protective layer, because of its excellent tensile strength, scratch and abrasion resistance, transparency, heat resistance, etc. Further, the preferable thickness of the transparent protective layer is 5 to 100 μm, and more preferable thickness lies within a range from 10 to 50 μm.

As the pattern shaped peel-off layer 47 or the entire surface peel-off layer 48, a resin material whose adhesive strength to the transparent protective layer 45 is weak is used. In practice, it is possible to use (1) a mixture of a polymethacrylate resin and another thermoplastic resin such as vinyl chloride-vinyl acetate copolymer, nitrocellulose resin, polyethylene wax or (2) a mixture of the cellulose acetate resin, thermosetting acrylic resin, melamine resin, etc.

One of these resins is applied on the transparent protective layer 45 by gravure printing into a pattern shape in order to form the pattern shaped peel-off layer 47 or onto an entire surface in order to form the entire surface peel-off layer 48, in such a way that the thickness thereof becomes 0.1 to 2 μm after dried. Here, the pattern shape implies a state in which a painted film is formed non-continuously on the transparent protective layer in the form of stripe, spot, pattern, pattern design, etc.

The light diffractive pattern forming layer 44, the reflective thin film layer 43, and the adhesive agent layer 41 are all the same as with the case of the first example shown in FIGS. 6(A) and 6(B), so that the detailed descriptio;n thereof is omitted herein.

Figure 9:
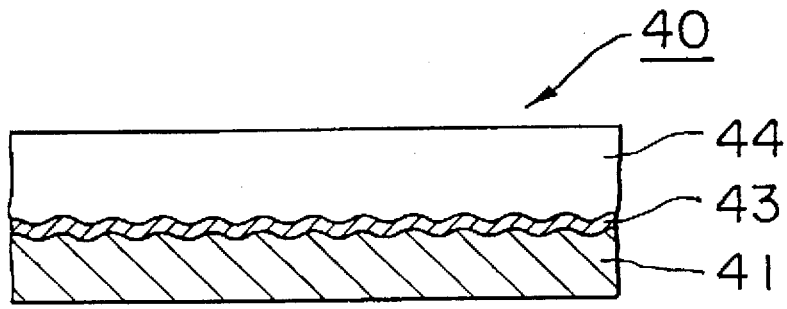
FIG. 9 is a cross-sectional view showing a fourth example of the fragile light diffractive structure formed on the outer surface of the cassette casing.

FIG. 9 is a simplified cross-sectional view for assistance in explaining a fourth example of the fragile light diffractive structure 40 to be formed on the outer surface of the cassette casing.

In this fragile light diffractive structure 40, a light diffractive pattern layer 44, a light reflective thin film layer 43, and an adhesive agent layer 41 are laminated in sequence from the outside thereof. The feature of this fourth example is to determine the total thickness of the light diffractive structure 40 to be less than 15 μm and more preferably less than 10 μm, so that whenever tired to be peeled off, the light diffractive structure itself adhered on the cassette casing is broken during removal and thereby it is impossible to reuse the removed light diffractive structure 40.

Since being difficult to handle this thin light diffractive structure as it is as a unit, it is preferable that the light diffractive structure 40 as described above is formed into a thermal transcription sheet or label (seal) by laminating the structure 40 on a releasable supporting substance or a supporting substance formed with a releasable layer, so that the light diffractive structure 40 can be adhered on the cassette casing as a thermal transcription sheet or a label (seal).

When transcribed from the thermal transcription sheet to the cassette casing, since the light diffractive structure 40 is peeled off from the supporting substance and then transcribed onto the cassette casing, the supporting substance will not remain on the outer surface of the light diffractive structure 40. In the case of the label (seal), however, even after adhered on the cassette casing, the supporting substance remains on the outer surface of the light diffractive structure 40. Here, when a transparent film formed of a biaxial oriented polyethylene telephtalate film or a biaxial oriented polypropylene film is used as the supporting substance, it is possible to use the supporting substance as a protective film, without peeling off the supporting substance.

Further, when a protective layer is required to be formed as an outermost layer of the light diffractive structure 40 adhered on the cassette casing, in both the cases of the thermal transcription sheet and label (seal), it is possible to form the light diffractive structure 40 by laminating the transparent protective layer 45, the light diffractive pattern forming layer 44, the reflective thin film layer 43, and the adhesive agent layer 41 in sequence on the releasable supporting substance, as shown in FIG. 6(B).

In this fourth example of the light diffractive structure 40, the thicknesses of the respective layers shown in FIG. 9 are somewhat reduced, respectively, as compared with those of the layers shown in FIG. 6(A). For instance, the thickness of the light diffractive pattern forming layer is determined as 0.1 to 3 μm; the thickness of the reflective thin film layer is determined as 100 to 1000 angstrom; and the thickness of the adhesive agent layer is determined as 0.1 to 5 μm. Further, when the outermost transparent protective layer is added as shown in FIG. 6(B), the thickness of this layer is 1 to 3 μm. On the basis of the above-mentioned respective thicknesses of the layers, it is possible to obtain both the function for realizing the light diffractive structure and the function for preventing the removed light diffractive structure from being used again, simultaneously and sufficiently.

In addition, as another example of the light diffractive structure, it is possible to replace the light diffractive pattern forming layer and the reflective thin film layer with a Lippmann hologram layer. In this case, the light diffractive structure can be formed as the thermal transcription film to be adhered on the outer surface of the cassette casing.

The Lippmann hologram is of well-known volumetric hologram, in which a light interference fringe pattern is recorded in the thickness direction of the film.

The film is of heterogeneous density substance having different density portions (i.e., portions different in light refraction factor). In this case, the different density portions can be dispersed uniformly or deviated in the film.

As the heterogeneous density substance, it is possible to use silver salt photo-sensitive substance, photo-polymer, photo-chromic substance, chalcogenide, photo-dielectric substance, electro-optical substance, etc.

In more detail, the above-mentioned silver salt photosensitive substance is a volumetric hologram layer obtained by photographing a hologram on the substance and by bleaching the same substance in such a way that the refraction factor of the photo-sensitive layer of the silver salt photosensitive substance can be changed in accordance with a serial processing of exposure, development, fixing, and bleaching.

Further, as the photo-polymer, it is possible to use PMMA, and photo-polymer film (Du Pont made). As the photo-chromic substance, there are spiropiran, Na doped $CaF_2$, Ni-doped $CaTiO_3$, and Na-doped KCl, etc.

When the Lippmann hologram layer formed of the above-mentioned substance is used, printing data can be not only recorded or reproduced, but also the outer appearance of the light diffractive structure is excellent from the design standpoint. Further, it is also possible to form this light diffractive structure as a fragile structure for prevention of its reuse, as already explained with reference to FIGS. 6(A) and 6(B) to FIG. 9.

In the thermal transfer film cassette i according to the present invention as described above, the position at which the light diffractive structure 20, 30 or 40 is formed on the cassette casing 10 is not limited to only the exemplary position as shown in FIG. 1. However, since the let-out roller 12 or the take-up roller 13 are both housed in the cassette casing 10, when the light diffractive structure 20, 30 or 40 is formed on the outer surface of the cassette casing 10, there exists such an advantage that both the light detector (light receiving element) 22 and the light source 21 can be arranged in a relatively small space within the printer 2.

Further, the size of the light diffractive structure 20, 30 or 40 formed on the cassette casing 10 changes according to the quantity of printing data. However, when signal data is recorded, only a square of 1×1 cm is sufficient.

Further, as the reproducing light source used for the thermal transfer printer, any light can be used as far as the a light diffractive image can be reproduced, for instance such as discharge lamps (e.g., natrium lamp, metal halide lamp, etc.), laser sources (e.g., gas laser, semiconductor laser, etc.), an EL panel, a light emitting diode, etc. However, the semiconductor laser is particularly suitable for the relief hologram of laser reproduction type, without taking a large space within the printer.

Further, as the detector (light receiving section), various light receiving devices can be used such as an image sensing tube (e.g., a photoelectric tube, image tube, SEC tube, vidicon, saticon, etc.), a solid state image sensing device, a CCD image sensor, a photodiode, a photo-transistor array, etc.

However, the CCD image sensor is particularly suitable to detect the reproduced hologram image and further to convert the detected optical data into electric signals, and also from the standpoint of its small size.

The thermal transfer recording method using the thermal transfer film cassette according to the present invention can be realized by adding the some parts or elements to the conventional thermal transfer printer. The added parts or elements are the reproducing light source oscillator, the detector (light receiving section), and a transmit circuit for transmitting optical data detected by the detector to a feed control circuit (for controlling the feeding operation of the thermal transfer film and the receiver sheet) and a head control circuit (for controlling the operation of the thermal head).

Further, even when the diffraction grating is used, instead of the light diffractive structure, the thermal transfer recording method as described above can be realized in the same way as with the case of the hologram.

Further, as the thermal transfer film 11 housed in the thermal transfer film cassette according to the present invention, it is possible to use a sublimation type transfer film, the thermo-melted transfer film, and a transcription film obtained by combining both the sublimation type transfer film and thermo-melted transfer film. In the case of the sublimation type transfer film, coloring material layers (magenta, cyan, and yellow are painted, separately) formed of a binder substance containing a sublimation dye are formed on a plastic base film. In the case of the thermo-melted transfer film, coloring material layers (magenta, cyan, yellow, and black are painted, separately) formed of a wax binder substance containing a pigment are formed on a plastic base film. Further, it is also possible to use a thermal transfer film having a single coloring material layer, as the thermal transfer film.

Further, in the case where the sublimation transfer film is used, a receiver sheet having a so-called dye acceptor layer formed on a substrate can be used as a receiver sheet used for the thermal transfer recording method according to the present invention. Here, the substrate is a paper, a synthetic paper, plastic film, or a laminated body of these papers or film. Further, in the case where the transparency is used as the thermal transfer film, a transparent plastic film can be used. In addition, in the case where the thermo-melted transfer film is used, the ordinary paper can be used.

What is claimed is:

1. A thermal transfer film cassette used after having been removably loaded in a thermal transfer printer, comprising:
a thermal transfer film for transferring thermo-recorded data onto a receiver sheet;
a cassette casing for housing said thermal transfer film therein; and
a light diffractive structure formed on said cassette casing, for forming a diffractive image when irradiated with reproducing light, the diffractive image having printing data related to adaptability between the thermal transfer film cassette and the thermal transfer printer.

2. The thermal transfer film cassette of claim 1, wherein said light diffractive structure is formed on an outer surface of said cassette casing.

3. The thermal transfer film cassette of claim 2, wherein said light diffractive structure is formed on said cassette casing in such a way that a surface of said light diffractive structure is flush with the outer surface of said cassette casing.

4. The thermal transfer film cassette of claim 3, wherein a transparent resin layer is formed on the surface of said light diffractive structure.

5. The thermal transfer film cassette of claim 2, wherein said light diffractive structure is formed on said cassette casing in such a way that a surface of said light diffractive structure is recessed from the outer surface of said cassette casing.

6. The thermal transfer film cassette of claim 5, wherein a transparent resin layer is formed on the surface of said light diffractive structure in such a way that a surface of said transparent resin layer is flush with the outer surface of said cassette casing.

7. The thermal transfer film cassette of claim 1, wherein said light diffractive structure is a hologram.

8. The thermal transfer film cassette of claim 7, wherein the hologram is a transparent hologram.

9. The thermal transfer film cassette of claim 7, wherein the hologram is a transcription type hologram adhered by thermal transcription method using transcribed foil.

10. The thermal transfer film cassette of claim 7, wherein the hologram is a seal type hologram having a protective film on a surface thereof.

11. The thermal transfer film cassette of claim 1, wherein said light diffractive structure is a diffraction grating.

12. The thermal transfer film cassette of claim 11, wherein the diffraction grating is a transparent diffraction grating.

13. The thermal transfer film cassette of claim 12, wherein the diffraction grating is a transcription type diffraction grating adhered by thermal transcription method using transcribed foil.

14. The thermal transfer film cassette of claim 13, wherein the diffraction grating is a seal type diffraction grating having a protective film on a surface thereof.

15. The thermal transfer film cassette of claim 1, wherein the cassette printing data are data usable for deciding whether the thermal transfer film cassette loaded in the thermal transfer printer is suitable for the thermal transfer printer or not.

16. The thermal transfer film cassette of claim 1, wherein the cassette printing data are data indicative of usage of the thermal transfer film.

17. The thermal transfer film cassette of claim 1, wherein the cassette printing data are data indicative of ink characteristics of the thermal transfer film.

18. The thermal transfer film cassette of claim 1, wherein said light diffractive structure is formed as being fragile, to disable the diffractive image from being formed when removed from said cassette casing.

19. The thermal transfer film cassette of claim 18, wherein said light diffractive structure is constructed by laminating a light diffractive pattern forming layer, a reflective thin film layer, a fragile layer, and an adhesive agent layer in sequence from an upper layer thereof; or by laminating a transparent protective layer, a light diffractive pattern forming layer, a reflective thin film layer, a fragile layer, and an adhesive agent layer in sequence from an upper layer thereof.

20. The thermal transfer film cassette of claim 18, wherein said light diffractive structure is constructed by laminating a light diffractive pattern forming layer, a reflective thin film layer, and a fragile adhesive agent layer in sequence from an upper layer thereof; or by laminating a transparent protective layer, a light diffractive pattern forming layer, a reflective thin film layer, and a fragile adhesive agent layer in sequence from an upper layer thereof.

21. The thermal transfer film cassette of claim 18, wherein said light diffractive structure is constructed by laminating a transparent protective layer, a pattern peel-off layer or an entire surface peel-off layer, a light diffractive pattern forming layer, a reflective thin film layer, and an adhesive agent layer in sequence from an upper layer thereof.

22. The thermal transfer film cassette of claim 18, wherein said light diffractive structure is constructed by laminating a light diffractive pattern forming layer, a reflective thin film layer, and an adhesive agent layer in sequence from an upper layer thereof.

23. A thermal transfer recording method of printing data by transcribing data thermo-recorded on a thermal transfer film onto a receiver sheet, comprising the steps of:
irradiating reproducing light on a light diffractive structure formed on a thermal transfer film cassette casing used after having been removably loaded in a thermal transfer printer;
detecting cassette printing data related to adaptability between the thermal transfer film and the thermal transfer printer on the basis of a diffractive image formed by the light diffractive structure irradiated with the reproducing light, by means of a light receiving section; and
controlling the thermal transfer printer on the basis of the detected results.

24. The thermal transfer recording method of claim 23, wherein printing operation of the thermal transfer printer is decided on the basis of the detected results.

25. The thermal transfer recording method of claim 23, wherein the light receiving section is arranged at a predetermined position within the thermal transfer printer according to a sort of the thermal transfer printer, and the cassette printing data are detected on the basis of whether the diffractive image formed by irradiating the reproducing light on the light diffractive structure can be detected by the light receiving section.

26. The thermal transfer recording method of claim 23, wherein the reproducing light is emitted by a semiconductor laser.

27. The thermal transfer recording method of claim 23, wherein the light receiving section is a CCD image sensor.

28. The thermal transfer recording method of claim 23, wherein the reproducing light is emitted by a semiconductor laser, and the light receiving section is a CCD image sensor.

29. The thermal transfer recording method of claim 23, wherein said light diffractive structure is a hologram.

30. The thermal transfer recording method of claim 23, wherein said light diffractive structure is a diffraction grating.

31. The thermal transfer recording method of claim 23, wherein the cassette printing data are data usable for deciding whether the thermal transfer film cassette loaded in the thermal transfer printer is suitable for the thermal transfer printer or not.

32. The thermal transfer recording method of claim 23, wherein the cassette printing data are data indicative of usage of the thermal transfer film.

33. The thermal transfer recording method of claim 23, wherein the cassette printing data are data indicative of ink characteristics of the thermal transfer film.

34. The thermal transfer recording method of claim 23, wherein the light diffractive structure is formed as being fragile, to disable the diffractive image from being formed when removed from the cassette casing.

35. The thermal transfer recording method of claim 34, wherein the light diffractive structure is constructed by laminating a light diffractive pattern forming layer, a reflective thin film layer, a fragile layer, and an adhesive agent layer in sequence from an upper layer thereof; or by laminating a transparent protective layer, a light diffractive pattern forming layer, a reflective thin film layer, a fragile layer, and an adhesive agent layer in sequence from an upper layer thereof.

36. The thermal transfer recording method of claim 34, wherein the light diffractive structure is constructed by laminating a light diffractive pattern forming layer, a reflective thin film layer, and a fragile adhesive agent layer in sequence from an upper layer thereof; or by laminating a transparent protective layer, a light diffractive pattern forming layer, a reflective thin film layer, and a fragile adhesive agent layer in sequence from an upper layer thereof.

37. The thermal transfer recording method of claim 34, wherein the light diffractive structure is constructed by laminating a transparent protective layer, a pattern peel-off layer or an entire surface peel-off layer, a light diffractive pattern forming layer, a reflective thin film layer, and an adhesive agent layer in sequence from an upper layer thereof.

38. The thermal transfer recording method of claim 34, wherein the light diffractive structure is constructed by laminating a light diffractive pattern forming layer, a reflective thin film layer, and an adhesive agent layer in sequence from an upper layer thereof.

* * * * *